(12) United States Patent
Carter (10) Patent No.: US 7,603,481 B2
(45) Date of Patent: Oct. 13, 2009

(54) DYNAMIC ROUTING THROUGH A CONTENT DISTRIBUTION NETWORK

(75) Inventor: Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1253 days.

(21) Appl. No.: 10/619,886

(22) Filed: Jul. 15, 2003

(65) Prior Publication Data

US 2004/0088431 A1 May 6, 2004

Related U.S. Application Data

(63) Continuation-in-part of application No. 10/285,271, filed on Oct. 31, 2002.

(51) Int. Cl.
*G06F 15/173* (2006.01)
(52) U.S. Cl. .................. 709/240; 709/239; 709/243; 370/230; 370/230.1; 370/231
(58) Field of Classification Search ......... 709/239–240, 709/243; 370/230–230.1, 231
See application file for complete search history.

(56) References Cited

U.S. PATENT DOCUMENTS

| | | | |
|---|---|---|---|
| 4,456,957 A | 6/1984 | Schieltz | 364/200 |
| 5,307,465 A | 4/1994 | Iki | 395/325 |
| 5,708,772 A | 1/1998 | Zeldin et al. | 395/183.01 |
| 5,737,319 A | 4/1998 | Croslin et al. | |
| 5,754,765 A | 5/1998 | Danneels et al. | 395/200.1 |
| 5,881,241 A | 3/1999 | Corbin | 395/200.68 |
| 5,920,864 A | 7/1999 | Zhao | 707/10 |
| 6,002,757 A | 12/1999 | Williams et al. | 379/207 |
| 6,047,331 A | 4/2000 | Medard et al. | 709/239 |
| 6,098,107 A | 8/2000 | Narvaez-Guarnieri et al. | |
| 6,108,713 A | 8/2000 | Sambamurthy et al. | 709/250 |
| 6,115,753 A | 9/2000 | Joens | |
| 6,256,295 B1 | 7/2001 | Callon | |

(Continued)

FOREIGN PATENT DOCUMENTS

EP 1499074 B1 4/2007

(Continued)

OTHER PUBLICATIONS

Ash, G , "Traffic Engineering & QoS Methods for IP-, ATM-, & TDM-Based Multiservice Networks", *Network Working Group Internet Draft*, (Oct. 2001),1-29.

(Continued)

*Primary Examiner*—Kenny S Lin
*Assistant Examiner*—Duyen Doan
(74) *Attorney, Agent, or Firm*—Schwegman, Lundberg & Woessner, P.A.

(57) ABSTRACT

Methods, systems, and data structures are provided for dynamically routing a data packet through a Content Distribution Network (CDN). A routing table includes a desired path for a data packet and one or more alternative paths. Each path includes links and each link connects pairs of an entry node, intermediate nodes, and a destination node together. Each link also includes policies that are processed by the entry node and the intermediate nodes. If conditions of currently available nodes (local nodes) trigger one or more of the policies, then any processing node dynamically reorders a number of the currently available nodes within the routing table. After the processing, the data packet is routed to a next or preferred currently available node within the routing table.

12 Claims, 4 Drawing Sheets

U.S. PATENT DOCUMENTS

| | | |
|---|---|---|
| 6,260,072 B1 | 7/2001 | Rodriguez-Moral |
| 6,347,078 B1 * | 2/2002 | Narvaez-Guarnieri et al. .... 370/230 |
| 6,393,489 B1 | 5/2002 | Sambamurthy et al. ..... 709/250 |
| 6,430,150 B1 | 8/2002 | Azuma et al. |
| 6,590,867 B1 * | 7/2003 | Ash et al. .................... 370/236 |
| 6,704,320 B1 | 3/2004 | Narvaez et al. |
| 6,704,842 B1 | 3/2004 | Janakiraman et al. |
| 6,857,026 B1 * | 2/2005 | Cain .......................... 709/239 |
| 6,914,912 B1 | 7/2005 | Skalecki et al. |
| 6,928,484 B1 | 8/2005 | Huai et al. |
| 7,035,937 B2 | 4/2006 | Haas et al. |
| 7,069,336 B2 | 6/2006 | Mangan |
| 7,168,044 B1 | 1/2007 | Mao |
| 7,362,709 B1 | 4/2008 | Hui et al. |
| 2002/0040396 A1 * | 4/2002 | Yoshihara et al. ........... 709/225 |
| 2002/0101875 A1 | 8/2002 | Lui et al. |
| 2003/0039212 A1 | 2/2003 | Lloyd et al. |
| 2003/0041167 A1 | 2/2003 | French et al. |
| 2005/0188108 A1 | 8/2005 | Carter et al. |

OTHER PUBLICATIONS

Lee, D. S., et al., "Performance Analysis of a Threshold-Based Dynamic Routing Algorithm", *Fundamental Role of Teletraffic in the Evolution of Telecommunications. Networks. Proceedings of the 14th International Teletraffic Congress—ITC 14, 1B*, (1994), 1475-1484.

Wittmann, et al., "Multicast Communication, 10 Protocols and Applications", XP002173748, Morgan Kaufmann Publishers, San Francisco, (May 2000), 66-67.

* cited by examiner

DYNAMIC ROUTING THROUGH A CONTENT DISTRIBUTION NETWORK

PRIORITY

This application claims priority to and is a continuation-in-part of pending U.S. Application entitled: "Enriched Tree for a Content Distribution Network," having a Ser. No. of 10/285,271 and filed on Oct. 31, 2002. The disclosure of this is incorporated by reference herein.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, Novell, Inc., All Rights Reserved.

FIELD OF THE INVENTION

This invention relates to content distribution networks and in particular to techniques for dynamically routing using enriched routing tables of a content distribution network.

BACKGROUND OF THE INVENTION

Conventionally, a network is abstracted into higher levels of abstraction in order to simplify the complexities of the underlying physical network. The abstraction is commonly viewed as an overlay on the physical network. Moreover, the abstraction is often referred to as a topology or logical map of the network. The map includes nodes representing physical (e.g., servers) or logical (e.g., applications) resources of the network. The map also includes links representing physical (e.g., media channels) or logical (e.g., protocols) communications between the nodes. A path from an entry or ingress node to one or more destination or egress nodes can be defined within the map by connecting nodes and links in an ordered manner. The nodes and links can also include costs that are determined by policies for the network. Thus, a path from an ingress node to an egress node can have an associated cost. The policies can include a variety of metrics or attributes for each of the links and nodes, such as bandwidth available, geographic distance, media transmission channel, and the like.

Once the nodes, links, and policies are known, spanning tree algorithms can be used to generate trees with the topology. The results of these algorithms produce paths within the network for routing data. These paths can be depicted within routing tables that are consumed by network routing devices and applications when routing the data through the network as data needed to pick a reasonable alternative is gathered.

Typical routing tables include a single path through a network for routing data, and should a failure occur alternative paths are dynamically generated by the hardware and software associated with a network device or application that unsuccessfully attempted to route a data packet via a failed link or node. Dynamically determining an alternative path within a routing table is fraught with problems, because, among other reasons, it unduly taxes the routing links and nodes of the network.

However, recently beneficial improvements have been made to these conventional approaches such that when a routing table is initially generated for a network, the routing table already includes a desired path and one or more alternative paths to use if a node or link failure occurs while routing data packets through the network. Such a beneficial improvement is described in U.S. Patent Application entitled "Enriched Tree for a Content Distribution Network," identified by Ser. No. of 10/285,271 and commonly assigned to Novell, Inc. of Provo, Utah.

With the teachings of the "Enriched Tree for a Content Distribution Network" invention, selective and optimal dynamic routing within a routing table can more efficiently be implemented. Rather than using typical techniques to dynamically generate from scratch alternative paths in the event of a failure, the alternative paths pre-exist in the routing tables of the "Enriched Tree for a Content Distribution Network" invention.

Yet, in some instances, based on current processing conditions of the links and nodes associated with a path, it can be advantageous to dynamically alter or redirect data packets to some predefined alternative paths on a local basis, in order to optimally use the network. For example, some links or nodes can be over utilized or underutilized at any particular point in time when a data packet is being routed. In these instances, it is desirable to selectively redirect the data packet to an alternative local link or node that may be currently underutilized. With improvements made to the "Enriched Tree for a Content Distribution Network" invention, such a circumstance can be realized for selectively and dynamically routing data packets through a network.

Thus, there is a need for providing selective dynamic routing of data packets through enriched routing tables for a network.

SUMMARY OF THE INVENTION

In various embodiments of this invention, techniques for dynamically routing a data packet through a Content Distribution Network (CDN) are presented. A routing table represents the CDN and includes a desired path and one or more alternative paths through the CDN. Each path includes links connecting pairs of an entry node, intermediate nodes, and a destination node. Each link includes policies that are processed by the entry node and the intermediate nodes in order to reorder a number of the intermediate nodes within the routing table.

More particularly and in one embodiment of this invention, a method for dynamically routing a data packet through a CDN is described. A routing table for a CDN and a data packet are received. The routing table represents a desired path and alternative paths through the CDN. Additionally, each path represents links between an entry node, intermediate nodes, and a destination node. Policies associated with currently available links for currently available paths are evaluated at the entry node or at one of the intermediate nodes, when the data packet is received. Next, currently available intermediate nodes are reordered within the routing table, if the policies are triggered by current conditions of the currently available intermediate nodes. Finally, the data packet is routed to a next available intermediate node of the routing table. The next available intermediate node is selected from one of the currently available intermediate nodes.

In another embodiment of the invention, another method for dynamically routing a data packet through a Content Distribution Network (CDN) is provided. Policies are associated with a routing table, and the routing table includes a desired path and one or more alternative paths. Each path includes links between an entry node, intermediate nodes, and a destination node. A receiving node evaluates the policies when a data packet is acquired. The receiving node also dynamically reorders next available intermediate nodes within the routing table when the policies are triggered.

In still another embodiment of the invention, a system for dynamically routing a data packet through a Content Distribution Network is taught. The system includes a routing table, policies, and a routing module. The routing table includes a desired path and one or more alternative paths. Each path includes links from an entry node through intermediate nodes to a destination node. Policies are associated with the links of the paths, and each link is associated with two connecting nodes. The routing module evaluates the policies associated with currently available links of the paths when a data packet is received and is to be routed though one of the currently available links. Moreover, the routing module dynamically reorders currently available intermediate nodes associated with the currently available links within the routing table when the policies are triggered.

In yet another embodiment of the invention, a CDN routing data structure implemented in a computer readable medium is provided for dynamically routing a data packet through a content distribution network. The CDN routing data structure includes a routing table and policies. The routing table is associated with a desired path and one or more alternative paths. Each path includes links, and each link represents connections between pairs of an entry node, intermediate nodes, and a destination node. The policies are associated with each link of the paths. Furthermore, the policies are processed by the entry node and the intermediate nodes in order to dynamically reorder the intermediate nodes of the routing table while routing the data packet through the CDN.

BRIEF DESCRIPTION OF THE DRAWINGS

FIG. 1 A is a diagram of an example topology of a CDN, according to one embodiment of the invention;

FIG. 1 B is a diagram of an example topology depicting enrichment of FIG. 1A, according to one embodiment of the invention;

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined by the appended claims.

In various embodiments of the invention, a Content Distribution Network (CDN) is abstracted into a topology that represents and simplifies the particulars associated with the actual physical network. Many routers, switches, hubs, and the like can be used for affecting the physical network that the topology abstracts. CDN administrators view the topology to create a job that describes the content/data to be moved through the CDN. Moreover, the CDN uses the topology to schedule when the job will process and where the content or data packet is to be delivered within the CDN. The topology characterizes the CDN and can be coupled with visualization applications to visually present the CDN to administrators.

Accordingly, administrators use the topology to visualize the network as one or more trees, where each tree has an ingress node (entry node), zero or more intermediate nodes, and one or more egress nodes (destination nodes). The nodes represent physical devices of the CDN (e.g., servers, computing devices, appliances, and others) and logical devices of the CDN (e.g., applications, server farms, and others). The nodes of the tree are connected via links. The links represent physical connections between the nodes (e.g., media channels, transmission line types, and others) and logical connections between the nodes (e.g., communication protocols used, security applications used, and others).

Moreover, depending upon a particular node's membership within a spanning tree at any given point in time that a data packet is being routed, an entry node and a destination node can be characterized as intermediate nodes. For example, a destination node can be used as an intermediate node within a path to a different destination node. Additionally, an entry node can be used as an intermediate node when receiving a data packet from another entry node. Thus, the characterization of entry nodes and destination nodes can change based on any particular processing node's current membership within a spanning tree during a data packet transfer through a CDN.

The topology permits attributes or characteristics of various trees to be readily discerned. For example, an entry node (e.g., a single tree's root node) can be depicted as an octagon; a destination node can be depicted as a circle with two triangles to the bottom right of the circle, and the like. Additionally, the displayed length of a link can be used to discern the physical distance of a communication connection between two nodes or, optionally, the quality and speed of the communication link. Thus, a link of longer length can be considered as associated with a less desirable communication connection than a link having a shorter length. Also, links can be presented as dashed lines with directional arrows in order to indicate a planned path of a data packet through any particular tree from the entry node to one or more destination nodes.

CDN topologies are well known to one of ordinary skill in the art, and readily made available to CDN administrators. Moreover, a variety of visual cues (e.g., colors, textures, fonts, and the like) can be used beyond what has been presented to identify various attributes and characteristics of nodes, links, and paths within the tree or topology of the CDN. Thus, the visual cues discussed above are presented for illustrative purposes only to assist in describing some embodiments of the invention, and should not be viewed as a limitation on the invention.

An entry node is a point in the topology where a data packet is injected into the CDN. A single tree depicted within the CDN topology includes a single entry node. It is not desirable to move the data packet, once received at an entry node, to all nodes of the CDN, since this is an inefficient use of the CDN resulting in redundant data transfers within the CDN. A destination node is an exit point for the data packet (e.g., device or appliance where the content/data is consumed) and, therefore, is a known consumer of the content/data.

Furthermore, the initial tree that is depicted within the CDN topology for the invention can be generated using any conventional algorithm, such as the Steiner spanning tree algorithm. Ad hoc or customized tree generating algorithms can also be used, such as when particular characteristics of the CDN make such an option desirable to do. Also, paths within the tree or topology can be generated using any conventional, ad hoc, or customized path generation algorithm. As one of ordinary skill in the art readily appreciates, path generation algorithms take input parameters (e.g., a pointer to the root of a tree, cost characteristics, policies, attributes of nodes and links, egress nodes, and the like) in order to produce one or more planned paths within a topology for the data packet to travel most efficiently.

The embodiments of the invention utilize the teaching of the "Enriched Tree for a Content Distribution Network" invention, such that a desired path and alternative paths are predefined before a data packet is routed through the CDN. These paths are represented in a routing table data structure. In addition to the routing table data structure, with teachings of this invention, policies are assigned to links between nodes of the paths. These policies are processed by entry nodes or intermediate nodes when a data packet is received and is to be routed further to another intermediate node or a destination node. When a node processes the policies, dynamic reordering of the routing table nodes can occur on a local basis. In other words, any particular processing node can alter the routing of a data packet along a planned path (e.g., link and node) to an alternative path (e.g., alternative link and node) when a processed policy dictates such a change based on conditions associated with next available links and nodes, which are immediately accessible to the processing node.

Furthermore, in one embodiment, the invention is implemented within CDN product offerings, distributed by Novell, Inc. However, it is to be understood that the teachings of the invention can be implemented in other existing products (e.g., existing routers, switches, hubs, cache accelerators, customized applications, and the like) and/or standalone products. All such modifications to existing products or to custom created products which use the teachings of this disclosure are intended to fall within the scope of this invention.

Figure 1A:
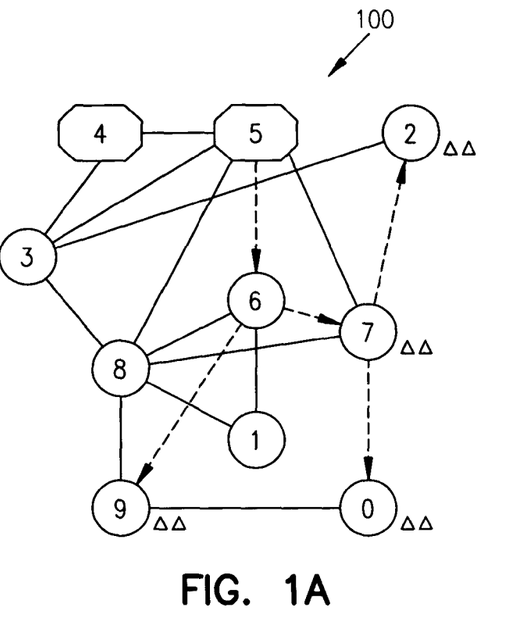

FIG. 1A illustrates a diagram of one example topology 100 of a CDN. The example topology 100 is embodied in a computer readable medium and represents CDN nodes 0-9. For purposes of illustration only, entry nodes 4 and 5 are depicted as octagons, while the destination nodes 9, 0, 7, and 2 are depicted as circles with two triangles to the lower right of the circles. The topology also includes circles with no triangles indicating intermediate nodes 3, 8, 6, and 1, which are neither entry nodes nor destination nodes within the CDN. Moreover, the length of the lines connecting the nodes can be viewed as costs associated with using a particular communication between two nodes. All cost, bandwidth, metrics, and the like have been aggregated and thus, a shorter length link is more desirable than a longer length link.

Each ingress node 4 and 5 can be viewed as a root of a tree having nodes within the topology 100. As one of ordinary skill in the art readily recognizes, trees can be derived and generated using any spanning tree algorithm, such as the Steiner spanning tree algorithm and others. For purposes of illustration only, the present example discussed in FIGS. 1A and 1B focuses on a single tree T having a root node depicted as entry node 5 within the topology 100. The application of a spanning tree algorithm results in a tree including the nodes 5, 6, 9, 7, 2, and 0.

In addition to generating initial tree T, any conventional, custom, or ad hoc path generation algorithm can be used to generate paths from the root node 5 of tree T to the corresponding destination nodes 9, 0, 7, and 2. For example, the path to destination node 9 is defined by traversing tree T in the following order 5->6->9. Likewise, the path to destination node 0 is defined by 5->6->7=>0. The path to destination node 7 is 5->6->7, and the path to destination node 2 is 5->6->7->2. Path generation algorithms are determined based on costs (e.g., characteristics of nodes and/or links, and/or policies of the CDN), which paths are most optimal for the CDN as a whole. Thus, in the present example, it is less expensive to move a data packet injected into the CDN at entry node 5 to node 6 before proceeding to any of the destination nodes 9, 0, 7, or 2.

Figure 1B:
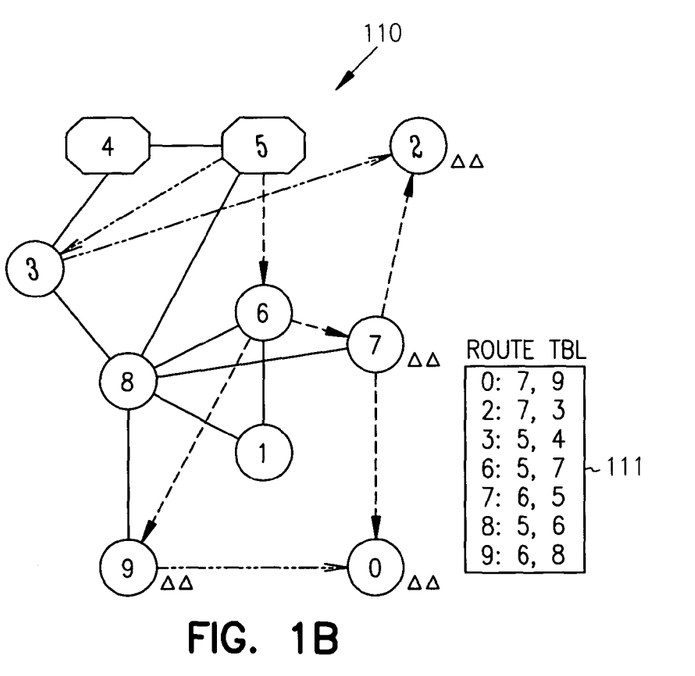

Once the tree T and the initial planned paths are derived from the topology 100 for the CDN, the tree is enriched to include one or more alternate paths within the tree T for the content/data to move in the potential event of node or link failures. FIG. 1B depicts one such incremental enrichment. Although, FIG. 1B depicts destination node 7 as being isolated within the topology 110, it is to be understood that this is not the case because the application of further incremental enrichment would create other links into destination node 7. This was done for purposes of illustration to isolate an example of enrichment. In fact, all paths original depicted in FIG. 1A also exist in FIG. 1B, however, FIG. 1B includes alternate or enriched paths that augment the existing paths of tree T in FIG. 1A.

Accordingly, FIG. 1B illustrates a diagram of one example topology 110 depicting enrichment of tree T in FIG. 1A, according to one embodiment of the invention. Enrichment of trees in the invention can occur based on configurable options supplied by a CDN administrator. The tree T can be enriched based on a particular node not being able to communicate with one of its corresponding parent nodes (Skip Parent enrichment type). Alternatively, tree T can be enriched based on a particular node not being able to communicate with one of its links (Join enrichment type). Moreover, an "optional enrichment" feature can be used with either of the two types of enrichment. Optional enrichment, organizes the alternative paths that are generated by enrichment from a least cost (e.g., shortest path) to a highest cost (e.g., longest path). Original planned paths for tree T and any alternative enriched paths for tree T are made available as routing tables for moving a data packet through the CDN. Also, each enrichment type can be used in isolation or in combination with the remaining enrichment type, with or without the optional enrichment feature.

Once a desired path (e.g., FIG. 1A: 5->6->7->2) and one or more alternative paths (e.g., FIG. 1B: 5->3->2) are determined using techniques described above, and described more completely in the "Enriched Tree for a Content Distribution Network" invention, an enriched tree T can be depicted in a data structure that can be readily consumed by network routing devices and applications. This data structure is depicted as routing table 111 in FIG. 1B. For example, destination node 2 is reachable only from node 7 or 3 via link 7->2 or 3->2.

Each link represented in the routing table 111 is also assigned one or more policy metrics. This association can be achieved via a reference pointer from each link to a policy data structure, or in some embodiments the policies can be embedded within the routing table 111.

In alternative embodiments, the policies are entirely separate from the routing table 111, such that the routing table 111 is any conventional routing table consumed by network routing devices and applications. In these embodiments, policy processing applications and policy data structures are used to interface the conventional routing table to the policies.

For example, if entry node 5 of FIG. 1B receives a data packet for routing to destination node 2, the desired path is acquired from routing table 111 as path 5->6->7->2 and an alternative path is acquired as 5->3->2. Thus, node 5 can route the data packet to node 6 or 3, the link 5->6 and 5->3 can be identified in a policy data structure and a routing module interfaced to conventional routing applications consuming routing table 111. Thus, before a data packet is routed to node 6 or 3 from node 5, the routing module is processed. The routing module then queries the policy data structure for policy metrics associated with links 5->6 and 5->3 and executes these policy metrics. If, while executing one of the policy metrics, the routing module determines that based on current conditions of local accessible nodes 3 and 6 that it more optimal to route the data packet via link 5->3 as opposed to link 5->6, then the routing module will dynamically reorder the routing table 111 entries such that destination node 2 becomes "2: 3, 7." This indicates that to reach destination node 2 it is now more desirable to first go through node 3, whereas initially the routing table 111 entry for FIG. 1B had indicated that 7 was more desirable (e.g., "2: 7, 3"). The reordered routing table is then presented to network routing devices and applications processing on node 5, where the data packet is routed to node 3 via link 5->3. This reordered routing table then stays in effect until another policy event causes another reordering.

Accordingly, with the teachings of this invention, any routing table 111 can be used in combination with policy data structures and routing modules. Therefore, no alterations need to be made to conventional routing devices and applications to realize the beneficial improvements of the invention.

Policies associated with links of the routing table can take a variety of forms, such as bits currently being received by a node or link, bits currently being transferred by a node or link, current applications being processed on a node, current priority assignments for network traffic on a node or link, and others. The policies are executable or interpretable statements processed by a routing module to acquire policy metrics at a given point in time from a link or a node. This is easily achieved since; the dynamic routing of this invention is selective based only on local nodes that are immediately accessible to a node processing the policies.

Figure 2:
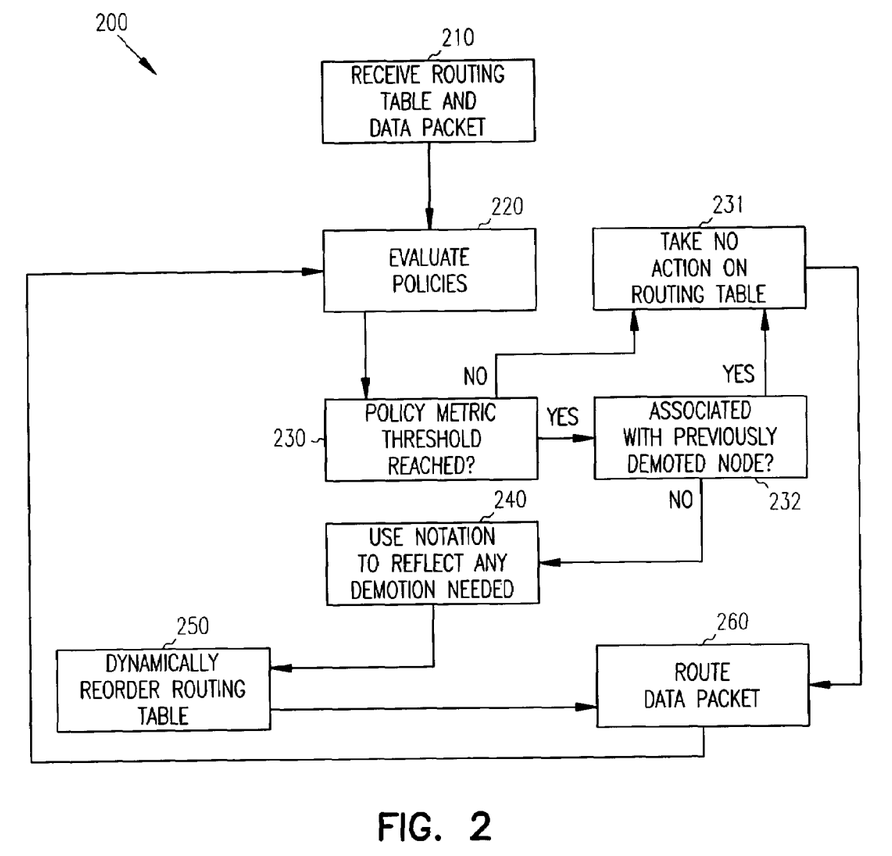
FIG. 2 is a flowchart representing a method for dynamically routing a data packet through a CDN, according to one embodiment of the invention.

FIG. 2 is a flowchart representing one method 200 for dynamically routing a data packet through a CDN. The processing of the method 200 is implemented in a computer-readable medium, and in one embodiment is implemented as a routing module. The routing module processes on nodes of the CDN.

At 210 a processing node or an initial processing node (entry node) receives a routing table and a data packet for routing through a CDN. In situations where the processing node receives the routing table and data packet, this information is received from a previously processing node that routes the data packet. In situations where the entry node receives the information, it is received from an application that initially starts the routing process through the CDN. Additionally, the routing table and data packet need not be received together by a processing node. Thus, although a processing node receives both the routing table and data packet, these items can be received separately by the processing node, and there is no requirement that they be received together.

The routing table represents an electronic data structure that can be used by network devices and applications for deriving a desired path and one or more alternative paths for the data packet through the CDN. As was previously discussed, the paths include links from an entry node through one or more intermediate nodes to one or more destination nodes, and each link connects two nodes together. Thus, the routing table is enriched in the manner discussed in the "Enriched Tree for a Content Distribution Network" invention.

Each link in the routing table can include policies, these policies are processed by a processing node that is currently in possession of the data packet and desires to route the data packet along a local link to a next currently available intermediate node. Thus, at 220, policies for locally accessible links, which are available to a processing node that is in possession of the data packet, are processed in order to evaluate policy metrics defined by the processed policies. In some instances, some links can include no associated policies, and in these situations a NULL policy is associated with such links.

Current policy metric values are acquired from current conditions associated with the currently available links (locally accessible) and nodes identified in the routing table. Some metrics include currently available link or node processing load, bandwidth utilization, and data traffic priority assignments. The processing node then compares the resulting metric values of the currently available links and nodes against the corresponding policy metric threshold values defined by the appropriate policies at 230.

If at 230 no threshold is detected, then at 231 no action is taken on the routing table and at 260, the processing node routes the data packet via a preferred link to a preferred node identified in the routing table in a normal and expected fashion. However, if any particular threshold is encountered, then an action associated with the appropriate policy is taken.

In one embodiment, before processing any action associated with a reached threshold, an additional check at 232 is made to determine if the action needed would promote a previously demoted node within the routing table. In such a circumstance, it may be desirable, to not promote a previously demoted node and to therefore proceed to 231 taking no action on the routing table, and routing the data packet at 260 to a preferred link and node defined in the routing table.

A promoted node is a node in a routing table that has been moved ahead of other nodes in the routing table, thus making it more preferred than the nodes that it has been promoted over. Conversely, a demoted node is a node in a routing table that is moved behind other nodes in the routing table, thus making it a less preferred node over the ones ahead of it.

Additionally, at 240, in some embodiments, if a required processing action will demote a link or node within the routing table, then formal notation can be used to uniquely identify such a link or node. This notation can be recorded within a policy data structure, the routing table, or within a separate data structure associated with the data structure, such that when a next processing node receives the data packet this situation can be detected, and if desired, the demoted node will not be subsequently promoted within the routing table by the next processing node.

At 250, if an action associated with reaching a threshold is reached and other conditions, as discussed above, are in order, then at 250, the routing table is dynamically reordered to reflect links and nodes that are promoted or demoted based on the action taken. Next, at 260, the data packet is routed via a new preferred link and node.

The processing of the method 200 is iterative and is processed by each entry node or intermediate node that receives the data packet beginning at 220. Moreover, in some embodiments, the entire initial enriched routing table can be distributed to all nodes of the CDN before the data packet is routed through the CDN. Alternatively, in some embodiments, the routing table is attached with the data packet and thus the processing of the method 200 can be iterated beginning at 210. However, in either of the two above alternative embodiments, any dynamically reordered routing table need not be communicated to subsequent processing nodes, since with the teachings of this invention, it is the currently available links and nodes (locally accessible links and nodes) that are reordered by any particular processing node. Thus, the reordered routing table is not needed by subsequent processing nodes. Alternatively, in some embodiments, it may be beneficial to at least report any reordered routing table to the currently available node that receives the data packet from a processing node that reordered the routing table, such as when previously demoted nodes are prevented from subsequently being promoted by subsequent processing nodes.

Furthermore, in some embodiments, the policies can be conditional such that if a particular link or node is promoted or demoted with the routing table, any subsequent processing nodes can use this information for processing alternative policies. Under these circumstances, retention and routing of reordered routing tables can prove beneficial to the processing nodes.

Figure 3:
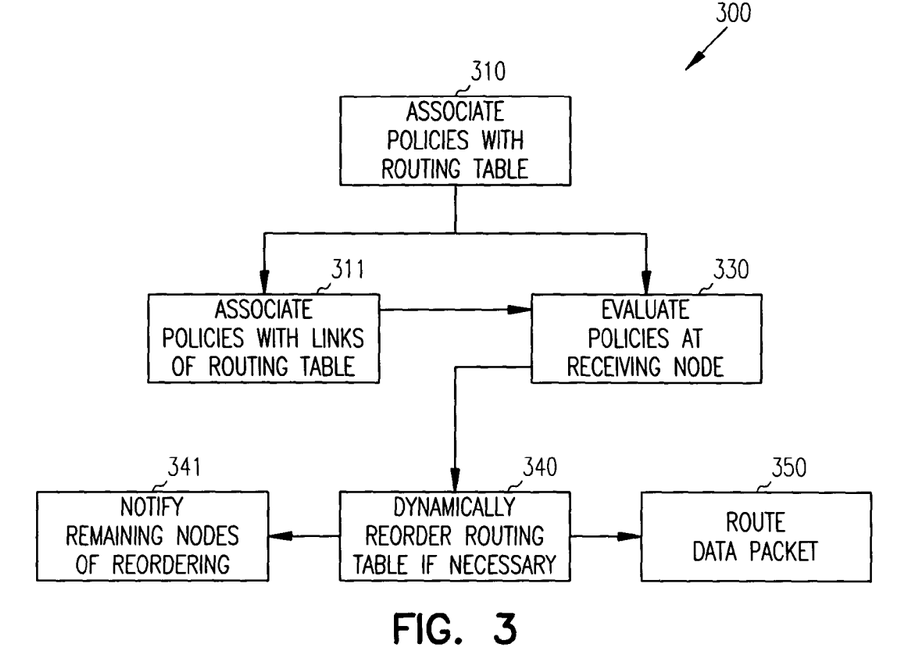
FIG. 3 is a flowchart representing another method for dynamically routing a data packet through a CDN, according to one embodiment of the invention.

FIG. 3 is a flow chart representing another method 300 for dynamically routing a data packet through a CDN. The processing of the method 300 is implemented in a computer-readable medium, and in one embodiment is implemented as a routing module for routing a data packet through a CDN.

Initially, at 310, policies are associated with a routing table. The routing table is an electronic data structure that is used for deriving a desired path and one or more alternative paths for a data packet to be routed through a CDN. A path includes one or more links from an entry node through one or more intermediate nodes to one or more destination nodes, and each link is a pair of nodes associated with one another.

Policies are executable or interpretable statements that are processed by receiving nodes in the CDN. These policies include metrics associated with threshold values for various processing conditions of locally accessible (currently available) links and nodes relative to the receiving (processing) node. Policies can be associated with the routing table in a variety of manners, such as by providing a link within the routing table to a policy data structure having the policies and metrics or by using a routing module in combination with the policy data structure that consumes and can alter the routing table before the routing table is passed on to a network routing device or application.

In one embodiment, at 311, the policies are associated with links defined in the routing table. Thus, any particular policy is executed by a receiving node for all currently available links and nodes accessible to the receiving node.

A receiving node, at 330, evaluates the appropriate policies by executing policy statements the query currently available intermediate nodes for policy metrics defined in the policies. Some of these metrics include bandwidth utilization, processing load, and traffic priority assignments. The currently available intermediate nodes respond with the results of the query processing, and these results are compared against threshold metric values defined in the policies. If a threshold value is reached or not reached then an action associated with the appropriate policy is triggered for processing on the receiving node.

If such a processing action determines that the currently available links and intermediate nodes need to be reordered within the routing table, then, at 340, the routing table is dynamically reordered to reflect any promotion or demotion of currently available intermediate nodes and links.

In some situations, such as the ones discussed above with FIG. 2, it can be desirable to notify the currently available nodes or all remaining nodes of the CDN that a reordering of the routing table has occurred. Thus, at 341, the receiving node sends the updated routing table or at least notice of the changes to the currently available nodes or all the remaining nodes. This can be useful when any subsequent receiving node is to use this information for purposes of not promoting previously demoted nodes or for purposes of conditionally using alternative policies for links based on any reordering that occurs in the routing table.

At 350, the receiving node routes the data packet to a next currently available node that is represented within the routing table as a preferred node and link for data transfer.

The embodiments of FIG. 3 demonstrate how selective routing of a data packet through a CDN occurs. In the embodiments, receiving nodes that currently possess the data packet access and process policies associated with currently available links and nodes. Execution of the policies results in values for current conditions on the currently available links and nodes. These values are compared to policy metric threshold values to trigger policy actions. Policy actions can result in a dynamic reordering of the routing table for preferred currently available links and nodes. The routing table is then provided to network routing devices or applications and the data packet sent to via the preferred link to the preferred node identified in the routing table.

Figure 4:
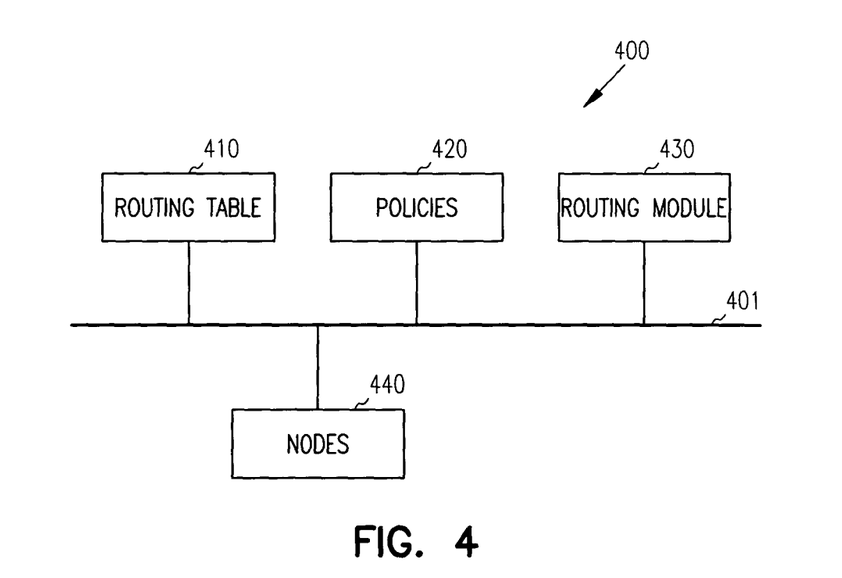
FIG. 4 is a diagram of a system for dynamically routing a data packet through a CDN, according to one embodiment of the invention.

FIG. 4 is a block diagram of one system 400 for dynamically routing a data packet through a CDN. The system 400 is implemented in a computer readable medium and can be processed by each node 440 of a CDN network 401. FIG. 4 depicts a single node 440 this is intended to reflect a processing node of the CDN 401, and is presented for purposes of illustration, since a plurality of nodes 440 exist within any given CDN 401.

The system 400 includes a routing table 410, policies 420, and a routing module 430. The routing table 410 is an electronic data structure consumed by network routing devices and applications when routing a data packet through the CDN 401. The routing table 410 provides a technique for the network routing devices and applications to derive a desired path and one or more alternative paths. Thus, the routing table 401 represents an enriched tree for a CDN 401.

A path includes a route for a data packet to be routed through the CDN 401 beginning at an entry node and traveling through one or more communication links to one or more intermediate nodes and ultimately to one or more destination nodes. The path includes communication links and each link is associated with a pair of nodes.

Policies 420 include policy threshold metrics and executable or interpretable statements for use by a processing node 440 in order to acquire processing conditions on currently available links and nodes (locally accessible links and nodes). Policies are associated with each link; a single link can have one or more policies. The designation of a processing node 440 occurs when any particular node is in possession of the data packet being routed through the CDN 401.

The routing module 430 consumes the routing table 410 and the policies 420. Moreover, the routing module 430 processes on each of the nodes once any particular node becomes designated as the processing node 440. The routing module 430 initiates when a processing node 440 receives the data packet for routing. Next, the routing module 430 acquires the policies 420 associated with currently available links and nodes defined in the routing table 410. These policies are processed for each of the currently available links and nodes and processing condition values are returned from each of the currently available nodes. These values are compared against policy metrics to determine if associated policy actions need to also be processed by the routing module 430. Policies can be used to acquire values from currently available links and nodes associated with current processing load, current number of bits being received per second, current number of bits being sent per second, current priority assignments for current data traffic, and others.

If a policy action is triggered, then the routing module 430 can dynamically reorder the preferred ordering of currently available links and nodes within the routing table 410. In this situation, a network routing device and application acquires the updated routing table 410 and routes the data packet through the new preferred link to the new preferred node.

In other embodiments, more complex routing operations can be achieved with system 400. For example, the routing table 410 can include formal notation identifying links and nodes that have been previously promoted or demoted. Any subsequent processing node's routing module 430 can use this information for selecting alternative policies 420 to process or to prevent an action from taking place based on a triggered policy 420.

Figure 5:
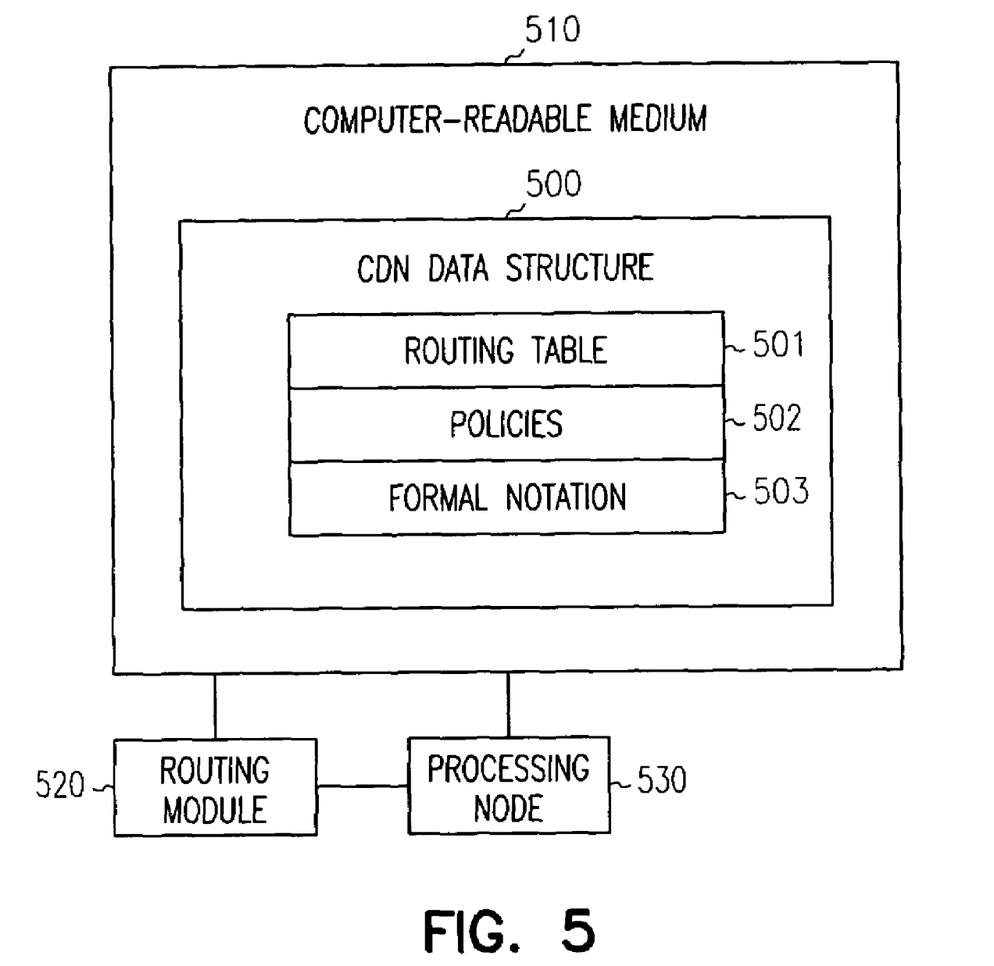
FIG. 5 is a diagram of a CDN routing data structure for dynamically routing a data packet through the CDN, according to one embodiment of the invention.

FIG. 5 is a block diagram of a CDN routing data structure 500 for dynamically routing a data packet through the CDN. The CDN routing data structure 500 is implemented in a computer readable medium 510. The CDN routing data structure 500 is processed by instances of a routing module 420. Each instance of the routing module 420 can process on processing nodes 430 of the CDN.

The CDN routing data structure 500 includes a routing table 501, policies 502, and optionally formal notation 503. The routing table 501 represents an enriched tree for the CDN. Thus the routing table 501 represents a desired path and one or more alternative paths for traversing through the CDN. Each path represents links from a pair of nodes, and each node can be an entry node, an intermediate node, or a destination node. The designation of a node as an entry node, intermediate node or destination node, can be changed based on a particular node's current membership within a spanning tree while routing the data packet. Accordingly, in some situations, an entry node can be designated as an intermediate node, and in some situations a destination node can be designated as an intermediate node.

The policies 502 include executable statements that can be processed by the instances of the routing module 520, policy metrics, and policy actions. The routing module 520 processes policy executable statements when a processing node is determining which currently available link and node to route the data packet. Each policy 502 associated with currently available links and nodes are processed by the routing module 520 to query the currently available processing nodes for values associated with current processing conditions of the currently available links and nodes. When these values are returned, the routing module 520 compares them to threshold policy metrics to determine what, if any, policy action to further execute.

Some policy actions that are triggered result in a preferred ordering of the currently available links and nodes to be altered or dynamically reordered within the routing table 501. This can occur for a variety of desired reasons, such as the previous preferred link and node that was included in the routing table 501 is too heavily loaded with processing or transferring other data to adequately handle the new data packet that the processing node 530 wants to route. Alternatively, reordering can occur when there is a desire to efficiently load balance or utilize data bandwidth throughout the CDN. In still other circumstances, reordering can occur based on priority assignments assigned to current network traffic on the currently available links and nodes.

In one embodiment, when reordering occurs for either promoting or demoting a node within the routing table 501, the reordering can be captured and retained within the CDN routing data structure 500 using any formal notation 503. Therefore, any subsequent processing node 530 can detect the formal notation and use this to process policies 502 selectively, or prevent certain policies actions from taking place, such as re-promoting a previously demoted node. The formal notation 503 can be associated with the policies 502 or the routing table 501.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for dynamically routing a data packet through a Content Distribution Network (CDN), comprising:

receiving a routing table for a CDN and a data packet, wherein the routing table represents a desired path and alternative paths through the CDN, and wherein each path represents links between an entry node, intermediate nodes, and a destination node;

evaluating policies associated with currently available links for currently available paths at the entry node and at each of the intermediate nodes, when the data packet is received on the entry node and when the data packet is received on each of the intermediate nodes, wherein the policies are executable statements processed at each of the intermediate nodes, the policies are executed by each of the intermediate nodes when the data packet is received at each of those intermediate nodes, and the policies are embedded in the routing table;

reordering currently available intermediate nodes within the routing table for the currently available links, when the policies are triggered by current conditions of the currently available intermediate nodes; and routing the data packet to a next available intermediate node of the routing table, wherein the next available intermediate node is one of the currently available intermediate nodes, and wherein at least one intermediate node selects the next available intermediate node that is associated with one of the alternative paths;

wherein the evaluating further comprises comparing policy priority metrics to the currently available intermediate nodes' data traffic for determining whether to trigger actions associated with the policy priority metrics;

wherein processing one of the actions for suspending existing traffic associated with one of the currently available nodes in order to accommodate the routing of the data packet based on the policy priority metrics associated with the data packet.

2. The method of claim 1 further comprising iterating the processing for evaluating, reordering, and routing at each intermediate node that receives the data packet until the data packet reaches the destination node.

3. The method of claim 1 wherein the evaluating further comprises comparing policy threshold metrics to the currently available intermediate nodes' processing load levels for determining whether to trigger actions associated with the policy threshold metrics.

4. The method of claim 3 further comprising, processing one of the actions to promote or demote one or more of the currently available intermediate nodes within the routing table.

5. The method of claim 1 wherein the evaluating further includes comparing policy bandwidth utilization metrics against existing bandwidth utilization levels associated with the currently available intermediate nodes for determining whether to trigger bandwidth utilization actions in order to load balance bandwidth use within the CDN.

6. A method for dynamically a data packet routing through a Content Distribution Network (CDN), comprising:

associating policies with a routing table, wherein the routing table includes a desired path and one or more alternative paths, and wherein each path includes links between an entry node, intermediate nodes, and a destination node;

evaluating, at a receiving node identified in the routing table, the policies when the receiving node acquires a data packet, and wherein the receiving node is one of the intermediate nodes, and wherein the policies are executable statements processed at of the receiving node, the policies are executed by each of the intermediate nodes when the data packet is received at each of those intermediate nodes, and the policies are embedded in the routing table; and reordering, at the receiving node, next available intermediate nodes within the routing table when the policies are triggered to change routing from the desired path to one of the alternative path;

routing the data packet to a next available intermediate node of the routing table, wherein the next available intermediate node is one of the currently available intermediate nodes, and wherein at least one intermediate node selects the next available intermediate node that is associated with one of the alternative paths;

wherein the evaluating further comprises comparing policy priority metrics to the currently available intermediate nodes' data traffic for determining whether to trigger actions associated with the policy priority metrics;

wherein processing one of the actions for suspending existing traffic associated with one of the currently available nodes in order to accommodate the routing of the data packet based on the policy priority metrics associated with the data packet.

7. The method of claim 6 further comprising, identifying the entry node as an initial receiving node.

8. The method of claim 7 further comprising, notifying, by the initial receiving node, remaining intermediate nodes within the routing table for any reordering of the routing table that occurs.

9. The method of claim 6 wherein the evaluating further comprises using policies associated with at least one of next intermediate node bandwidth utilization levels, next intermediate node utilization levels, and next intermediate node traffic priority assignments.

10. The method of claim 6 wherein the associating further comprises assigning the policies to the links established between the nodes and forming the desired path and the one or more alternative paths.

11. The method of claim 6 further comprising preventing previously demoted intermediate nodes from being promoted at the receiving node when reordering of the routing table occurs.

12. The method of claim 11 further comprising, using a formal notation to update the routing table or the policies in order to identify the previously demoted intermediate nodes.

* * * * *

UNITED STATES PATENT AND TRADEMARK OFFICE
CERTIFICATE OF CORRECTION

PATENT NO. : 7,603,481 B2  
APPLICATION NO. : 10/619886  
DATED : October 13, 2009  
INVENTOR(S) : Stephen R. Carter Page 1 of 1

It is certified that error appears in the above-identified patent and that said Letters Patent is hereby corrected as shown below:

In column 13, line 41, in Claim 6, after "dynamically" insert -- routing --.

In column 14, line 3, in Claim 6, after "processed at" insert -- each --.

Signed and Sealed this

Thirteenth Day of July, 2010

David J. Kappos  
*Director of the United States Patent and Trademark Office*

UNITED STATES PATENT AND TRADEMARK OFFICE
CERTIFICATE OF CORRECTION

PATENT NO.      : 7,603,481 B2                                                     Page 1 of 1
APPLICATION NO. : 10/619886
DATED           : October 13, 2009
INVENTOR(S)     : Stephen R Carter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this

Fifth Day of October, 2010

David J. Kappos
*Director of the United States Patent and Trademark Office*